United States Patent
Fogliatti et al.

(10) Patent No.: US 6,880,400 B1
(45) Date of Patent: Apr. 19, 2005

(54) PHASE SYNCHRONIZED ARRAY OF NON-IDENTICAL OSCILLATORS USING COUPLING NETWORK

(75) Inventors: David W. Fogliatti, Carlsbad, CA (US); Brian K. Meadows, San Diego, CA (US); Joseph D. Neff, San Diego, CA (US); Visarath In, Chula Vista, CA (US); Adi R. Bulsara, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/446,284

(22) Filed: May 23, 2003

(51) Int. Cl.$^7$ .................................................. G01P 9/04
(52) U.S. Cl. .................................. 73/504.12; 73/504.14
(58) Field of Search ......................... 73/504.02, 504.04, 73/504.12, 504.13, 504.14, 504.15, 504.16

(56) References Cited

U.S. PATENT DOCUMENTS

| | | | | |
|---|---|---|---|---|
| 4,710,027 A | * | 12/1987 | Fersht et al. ................. 356/472 |
| 4,724,351 A | * | 2/1988 | EerNisse et al. ............. 310/328 |
| 5,189,913 A | * | 3/1993 | Netzer et al. .............. 73/504.08 |
| 6,191,521 B1 | * | 2/2001 | Fell et al. .................... 310/326 |
| 6,598,475 B1 | * | 7/2003 | Pinson ..................... 73/504.12 |
| 2001/0008087 A1 | * | 7/2001 | Mochida .................. 73/504.12 |
| 2004/0069062 A1 | * | 4/2004 | Cho ......................... 73/504.12 |

OTHER PUBLICATIONS

Bao, Min–Hang; "Micro Mechanical Transucers, Pressure Sensors, Accelerometers and Gyroscopes"; Handbook of Sensors and Acctuators, vol. 8, 2000 (pp 16–19, pp 362–369), USA.

Fogliatti, David W.; "Interconnected Resonant Gyros for Improved Performance"; 2002 IEEE International Symposium on Circuits and Systems; May 26–29, 2002; pp IV289–IV292, vol. IV; IEEE PUblications, USA.

* cited by examiner

Primary Examiner—Helen C. Kwok
(74) Attorney, Agent, or Firm—Peter A. Lipovsky; Michael A. Kagan; Allan Y. Lee

(57) ABSTRACT

An array of non-identical oscillators, driven by a common external driving force, is synchronized in phase. An example application is the phase synchronizing of non-identical vibratory gyroscopes to provide enhanced gyroscope sensitivity while minimizing the need for gyroscope proof mass alteration and individual gyroscope electronics.

24 Claims, 13 Drawing Sheets

PHASE SYNCHRONIZED ARRAY OF NON-IDENTICAL OSCILLATORS USING COUPLING NETWORK

BACKGROUND

This invention relates to an array of driven, non-identical oscillators. With greater specificity, but without limitation thereto, the invention relates to an array of driven, non-identical, vibratory gyroscopes whose phases are synchronized via a coupling network.

Current designs for vibratory gyroscopes typically use one sensor per angular axis or an arbitrary number of independent gyroscopes per angular axis. For the case of a single gyroscope, sensitivity improves as the gyro's proof mass is increased; however sufficiently increasing the proof mass is not always practical or even possible. Sensitivity can also be enhanced by using an array of independent vibratory gyroscopes, all of which are arranged to sense along a single angular axis. In such an array, each gyroscope will have its own electronics to excite its drive axis and to demodulate its output signal. These additional electronics increase the size and power requirements of the array. The size, power, and cost of the accompanying electronics necessary for each gyroscope in the array limit the usefulness of this approach.

In the oscillator field, it is desirable to achieve the enhanced sensitivity that an array of oscillators can offer, while at the same time minimizing gyroscope proof mass alteration and associated electronics.

SUMMARY

The invention permits an array of non-identical oscillators, driven by a common external driving force, to be synchronized in phase. An example application is the phase synchronizing of non-identical vibratory gyroscopes to provide enhanced sensitivity while minimizing the need for gyroscope proof mass alteration and individual gyroscope electronics.

A discussion of the fundamentals of vibratory gyroscopes may be found in Bao, M.-H. 2000. *Handbook of Sensors and Actuators, Micro-Mechanical Transducers: Pressure Sensors, Accelerometers and Gyroscopes*, Elsevier. Vol. 8, pp. 16–19 and pp. 362–369, incorporated by reference herein.

Other objects, advantages and new features of the invention will become apparent from the following detailed description of the invention when considered in conjunction with the accompanied drawings.

DESCRIPTION

Figure 1:
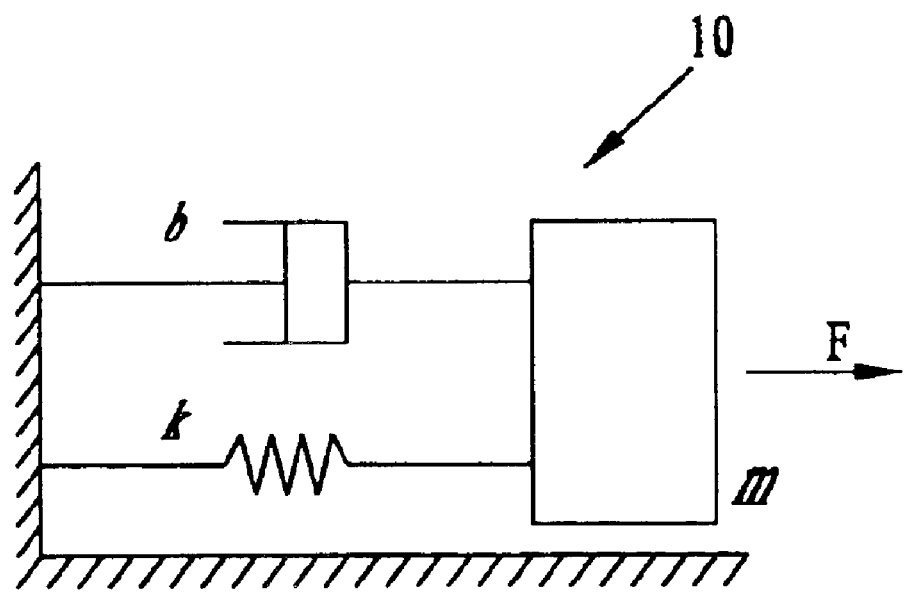
FIG. 1 depicts a spring-mass-damper system.

Referring to FIG. 1, a representative oscillator 10 is shown. The linear parameters of oscillator 10 are characterized by Eq. (1) wherein m represents mass, b represents a damping coefficient, and k is a linear restoring coefficient. The quantity F(t) is an external driving force acting upon the oscillator. The parameter z represents the displacement of the oscillator for the mass-spring-damper system.

$$m\ddot{z} + b\dot{z} + kz = F(t) \tag{1}$$

Figure 2:
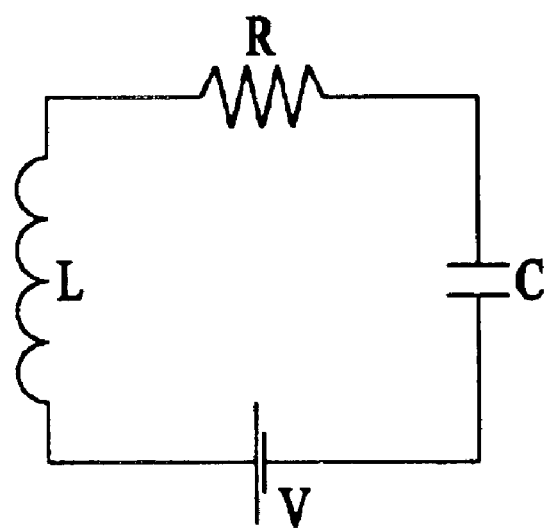
FIG. 2 shows an R-L-C representation of FIG. 1.

As shown in FIG. 2, the oscillator of FIG. 1 can also be represented as an electrical system using a resistor (R), inductor (L), and capacitor (C). Such as system is characterized in Eq. (2) wherein F(t) is a voltage (V) applied to the system and Q is the charge in the system.

$$L\ddot{Q} + R\dot{Q} + \frac{1}{C}Q = V(t) \tag{2}$$

The mass-spring-damper representation will be used for all further examples to be described herein. Consider an array having a plurality of N oscillators whose linear parameters follow Eq. (1). Each oscillator in the array is not restricted to have the same parameter values for m, b, and k. For the simulations and analytical calculations to be described, it is assumed that each system parameter has a mean value and a given distribution about its mean value. Let i denote the $i^{th}$ oscillator in the array. If we restrict our discussion to an array of linear oscillators driven by the same external forcing term F(t), we have the following differential equation for each oscillator in the array.

$$m_i\ddot{z}_i + b_i\dot{z}_i + k_i z_i = F(t) \tag{3}$$

For illustrative purposes, we let F(t) be a harmonic forcing term with the following form:

$$F(t) = A_d \sin(w_d t) \tag{4}$$

where $A_d$ is the amplitude, and $w_d$ is the frequency, of the harmonic forcing term. In the steady state, the solution for the motion of each oscillator has the following form:

$$z_i(t) = A_i \sin(w_d t + \phi_i) \tag{5}$$

where $A_i$ is the oscillator amplitude and $\phi_i$ is the oscillator phase relative to the harmonic forcing of the ith oscillator in the array. Each oscillator frequency matches the drive frequency ($W_d$) of the harmonic driving term.

The phase offsets ($\phi_i$) or differences between the phase of an oscillator and the phase of the harmonic forcing will vary from oscillator to oscillator based upon variations in the mass, damping and spring constant parameters between oscillators. To enhance the sensitivity of the array in detecting information regarding the external driving force (e.g. harmonic forcing) affecting the array, it is desirable to minimize the differences between the oscillator phase offsets ($\phi_i$).

On way of accomplishing this is through the use of a coupling network that connects each oscillator in the array to at least one other oscillator in the array. An example coupling network known in the art is the nearest-neighbor network using identical coupling coefficients (kappa). The coupling coefficients are directly proportional to what is known as the coupling strength of the couplings and is user chosen.

The differential equation for this system using an array of three or more linear oscillators with periodic boundary conditions (same boundary conditions for all oscillators) is shown below.

$$m_i \ddot{z}_i + b_i \dot{z}_i + k_i z_i = F(t) + kappa(z_{i+1} - 2z_i + z_{i-1}) \quad (6)$$

Next is an example of two nearest-neighbor coupled oscillators driven by identical harmonic forcing terms. The differential equations for the system are the following:

$$m_1 \ddot{z}_1 + b_1 \dot{z}_1 + k_1 z_1 - kappa(z_2 - z_1) = F(t) \quad (7a)$$

$$m_2 \ddot{z}_2 + b_2 \dot{z}_2 + k_2 z_2 - kappa(z_1 - z_2) = F(t) \quad (7b)$$

Figure 3:
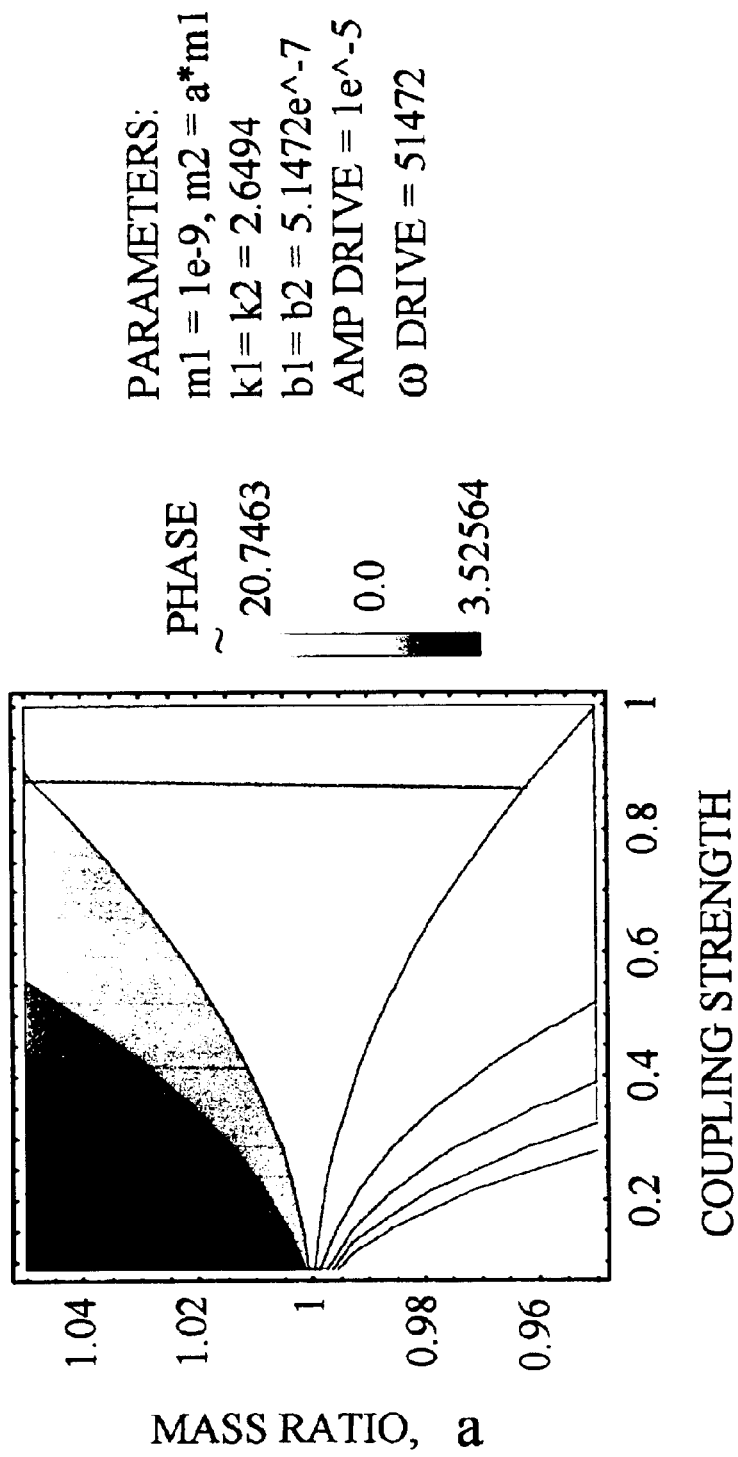
FIG. 3 illustrates a contour plot of phase difference corresponding to mass difference vs. coupling strength for two coupled oscillators.

If we let b1=b2=b, k1=k2=k, and m1=a*m2, a contour plot (see FIG. 3) can be made coding the phase difference of the steady state solutions for the phase ($\phi_i$) of each oscillator from Eq. 5 vs. the parameter "a" which characterizes the mass difference between the two oscillators and the value of the coupling strength (kappa, κ).

When the coupling strength parameter (kappa, κ) is zero, the oscillators are the equivalent of being uncoupled. For the parameters shown and a mass variation of up to 5%, the phase difference will fall between −20 and 3.5 degrees. As the coupling strength is increased, we see that the region of roughly no phase difference (0.0) increases. Thus for a=0.98, a coupling strength=~0.7 is able to minimize the phase difference. The coupling strength is user selectable and is chosen based upon the parameter variations expected. For a linear oscillator, the parameter variation can occur in the mass, spring or damping coefficients.

Figure 4:
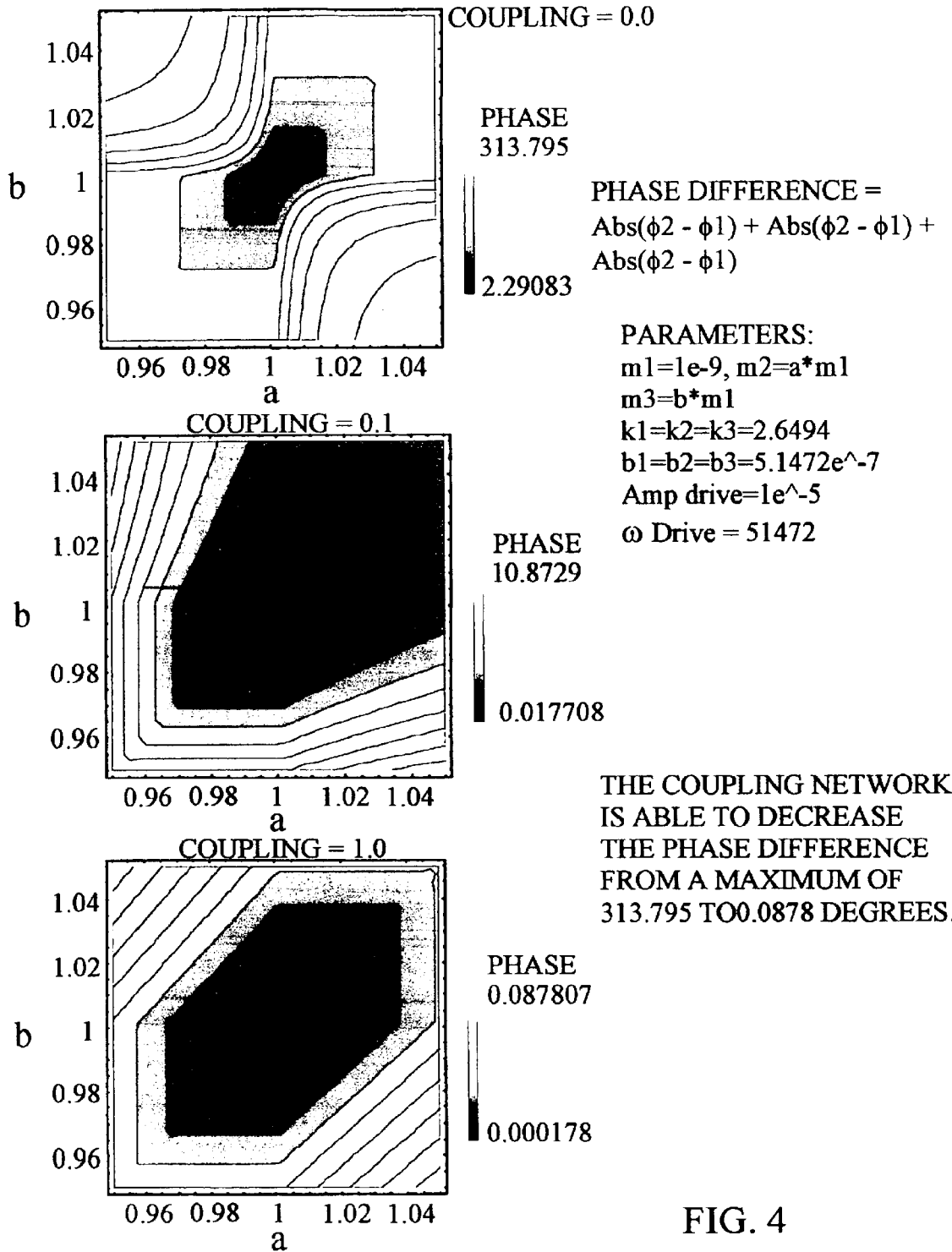
FIG. 4 illustrates contour plots of phase difference corresponding to mass difference vs. coupling strength for three coupled oscillators.

As is shown in FIG. 4 we can make a similar plot for three nearest-neighbor coupled oscillators following the form of Eq. (6) by letting b1=b2=b3=b', k1=k2=k3=k, m1=m1, m2=a*m1, and m3=b*m1. Here the parameters "a" and "b" control how the masses of the oscillators differ.

Simulations have also been conducted in which all parameters are allowed to vary by up to 10% about a mean value. Under these conditions, the coupling network is still able to minimize the phase differences.

By minimizing the phase offset of each oscillator relative to the other oscillators in the array, the response from each oscillator can easily be summed in the time domain before any signal processing or demodulation is conducted to extract information about the forcing signal F(t).

An example use of the above described technique takes the form of an array of vibratory gyroscopes and a coupling network that links each element in the array to at least one other element in the array. The linear dynamics for each gyroscope in the array can be approximated by the model of FIG. 5 and the following equations.

$$m\ddot{y} = -k_y y - C_y \dot{y} + F_{drive} \quad \text{(drive)} \quad (8a)$$

$$m\ddot{z} = -k_z z - C_z \dot{z} + F_{cz} \quad \text{(sense)} \quad (8b)$$

$$F_{cz} = \text{Coriolis Force} \quad (8c)$$

$$= |2m\vec{\Omega}_x \times \dot{y}|$$

Figure 5:
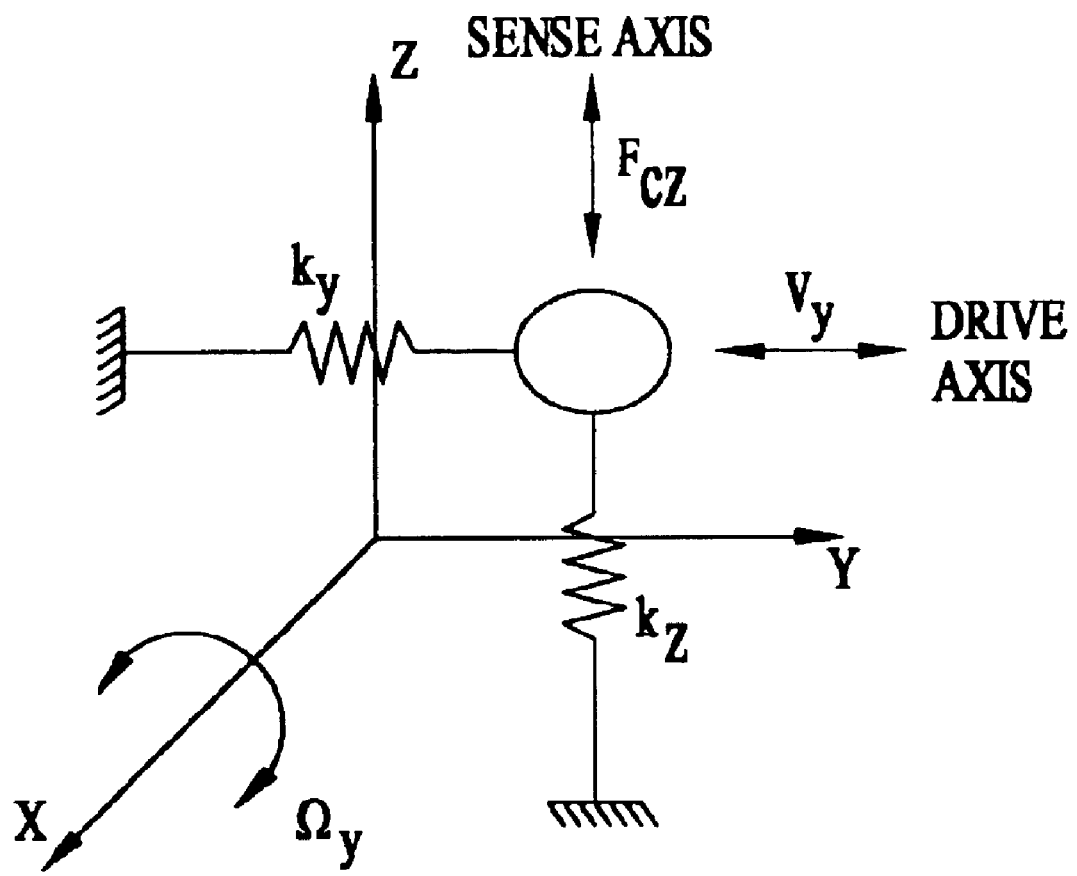
FIG. 5 illustrates a simplified model of a vibratory gyroscope.

The gyroscope of FIG. 5 has two orthogonally oriented excitation modes with restoring coefficients $k_y$ and $k_z$ and mass m. Damping coefficients along each axis ($C_y$ and $C_z$) are included in the model. The (drive) y-axis mode is excited by a reference drive force. The (sense) z-axis mode is excited by an external force known as the Coriolis force ($F_{cz}$) for a gyroscope undergoing angular rotation about the x-axis. Displacements along the sense or z-axis are proportional to the angular rotation rate $\Omega_x$, if the motion of the drive axis is known.

Equations 8a–c model the linear response of the gyroscope system. The system can also include nonlinear forces that are not included in equations 8a–c and are specific to a hardware realization.

Equations 8a–c can be put into a more general form if an amplitude modulated sinusoidal force is used to represent the Coriolis term in the sense axis equation (8b). This simplification also requires that the drive axis displacement follow a harmonic motion of the form cos($w_d t$). Equation (9) describes the sense axis motion (z-axis in FIG. 5) for the $i^{th}$ gyroscope in an array using a sinusoidally driven, linearly damped, harmonic oscillator model. A linear coupling network of strength (kappa) has been added to model a nearest-neighbor type coupling network for a one-dimensional array of gyroscopes. The parameter λ models the energy transfer from the drive to the sense mode in the gyroscope. The angular rotation rate is denoted by $\Omega(t)$.

$$m_i \ddot{z}_i + C_i \dot{z}_i + k_i z_i = \lambda_i \Omega(t) \sin(w_{drive} t) + kappa(z_{i+1} - 2z_i + z_{i-1}) \quad (9)$$

The parameters for each gyroscope (m, C, and k) in the array are not assumed to be identical. For the simulations conducted, the gyroscope masses ($m_i$) are varied about a mean value.

The purpose of the coupling network is to synchronize the displacements along the sense or z-axis in phase and frequency so each gyroscope responds in an identical fashion to the angular rotation rate $\Omega(t)$. In this example, this angular rotation rate is what the gyroscope array is designed to sense. Without the coupling network, each oscillator would have a different phase offset relative to the driving frequency. It is assumed all oscillators are driven at the same drive frequency ($\omega_{drive}$).

Figure 6:
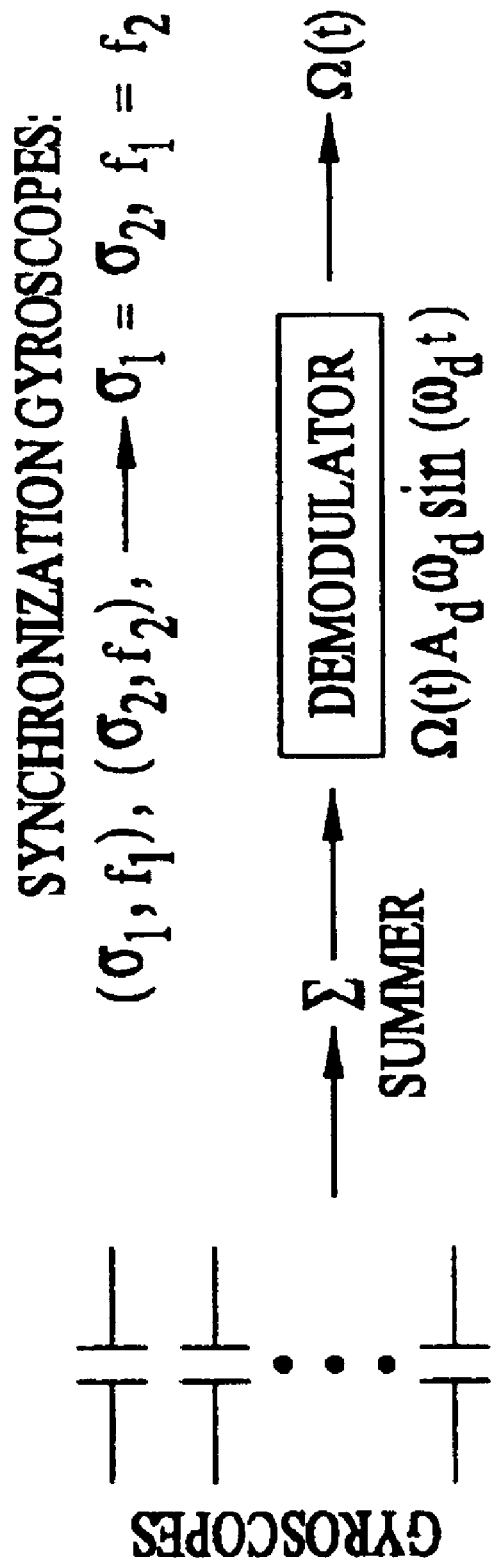
FIG. 6 is a quasi-mathematical depiction of a phase synchronized gyroscope array.

The coupling network synchronizes the displacements of the sense axis in phase and in frequency for each gyroscope in the array. When all of the gyroscopes are thus synchronized, the output signal from each gyroscope can be coherently summed to provide a maximized output signal. This summed signal can then be demodulated to estimate the angular rotation rate $\Omega(t)$. Such a technique is represented in FIG. 6.

Figure 7:
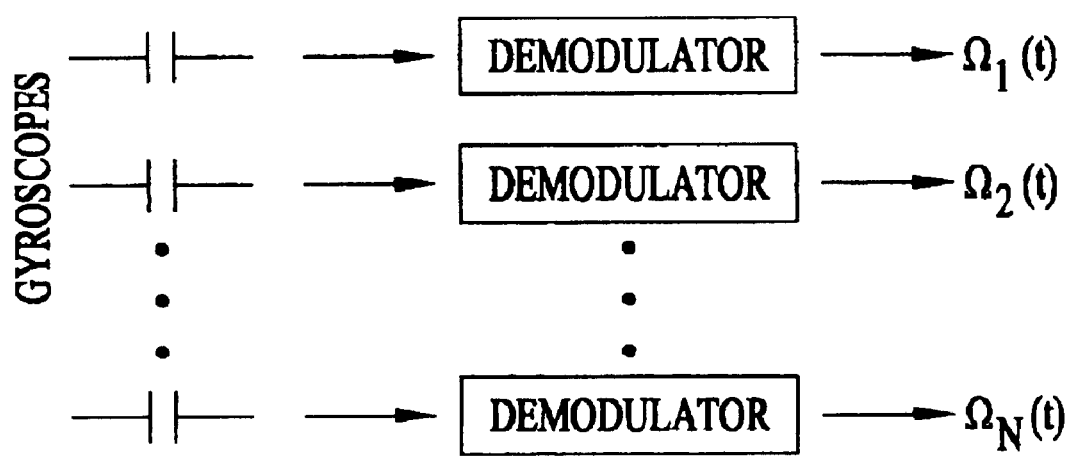
FIG. 7 illustrates a quasi-mathematical description of a gyroscope array lacking phase coupling.

In contrast, if a coupling network is not present, the angular rotation rate sensed by each gyroscope is estimated by demodulating the output of each gyroscope separately. The final estimate for the array is calculated by summing the individual estimates and dividing by the number of gyroscope elements in the array. As previously explained, a disadvantage of this method is that each gyroscope must have a demodulator. An example of such a design is shown in FIG. 7.

Figure 8:
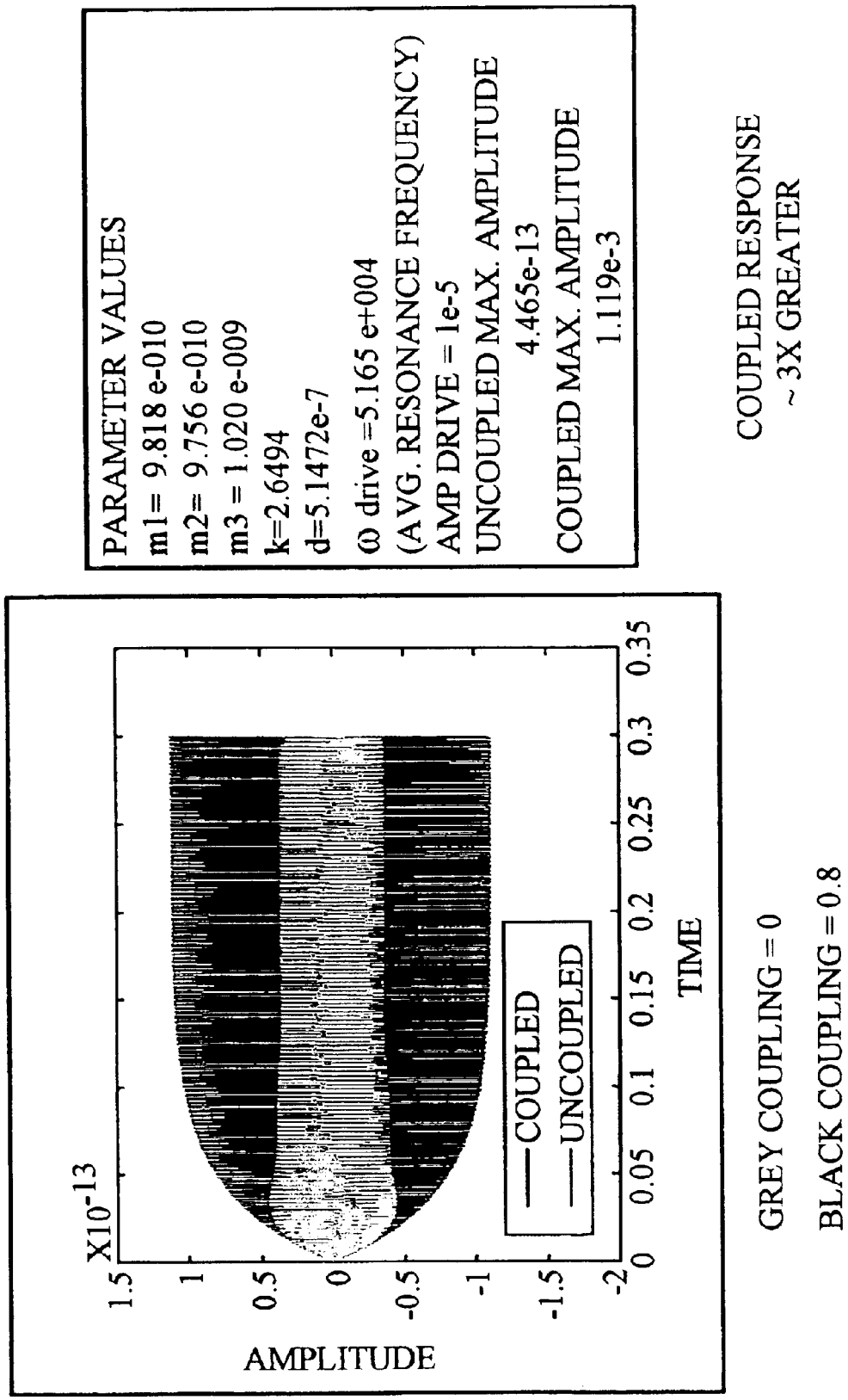
FIG. 8 illustrates an array response for coupled and uncoupled vibratory gyroscopes having varied masses.

FIG. 8 shows the results from a simulation based on a micro-electromechanical system (MEMS) vibratory gyroscope array when a constant amplitude harmonic force is applied to the array. This is equivalent to the gyroscope array starting from rest and then a constant angular rotation is applied.

The black area shows the summed output of an uncoupled three element gyroscope array before demodulation (coupling strength=0). The gray areas show the coupled output from the identical three element gyroscope array (coupling strength=0.8). Only the masses of each gyroscope are not identical. The maximum response is roughly three times greater for these parameters using the summed output from the coupled array compared to the summed output of the uncoupled array. The parameters and maximum amplitude are indicated to the right of the array graph.

Figure 9A:
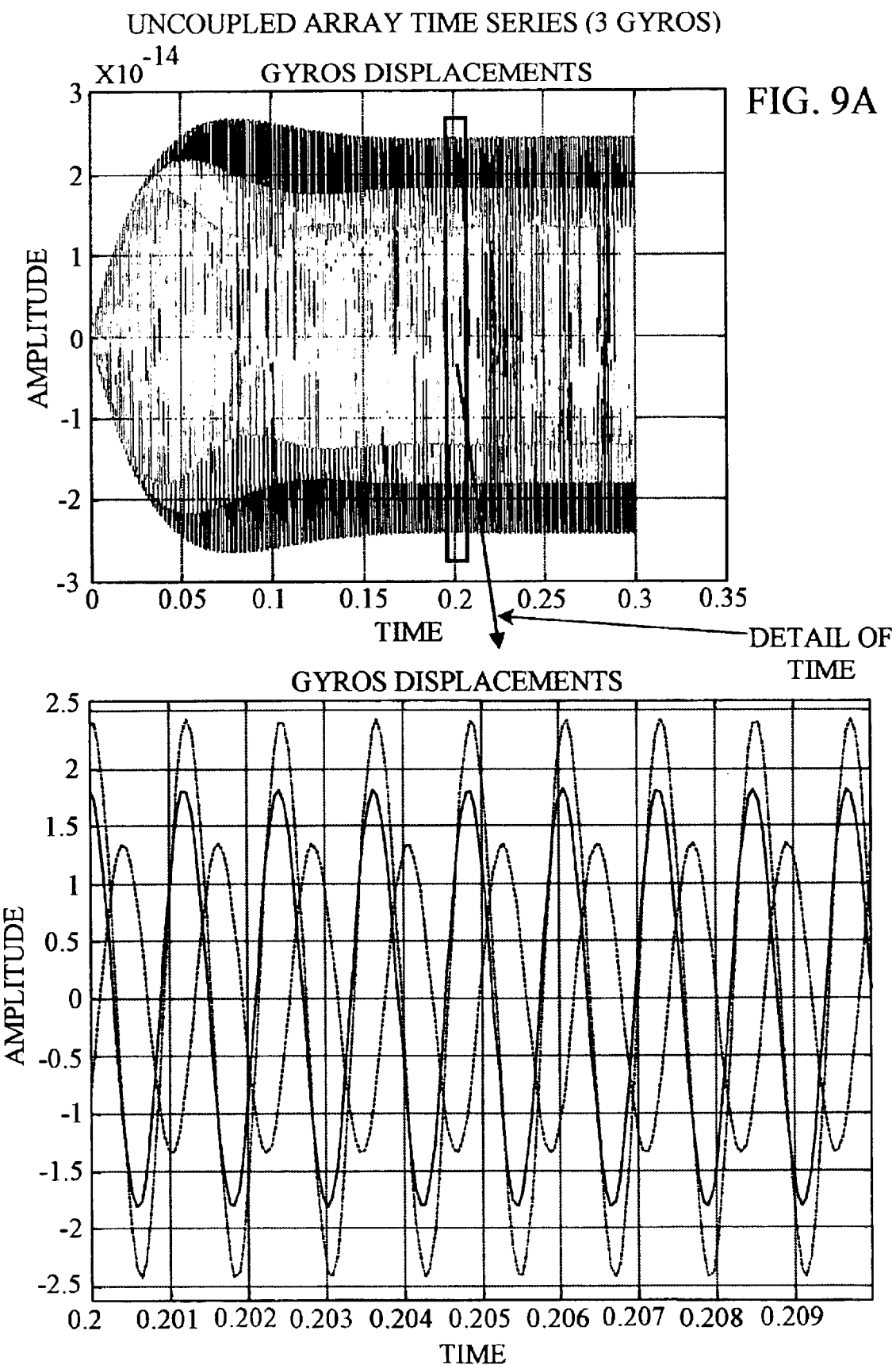
FIGS. 9A and 9B illustrates the individual time series for uncoupled and coupled arrays of vibratory gyroscopes, respectively.
Figure 9B:
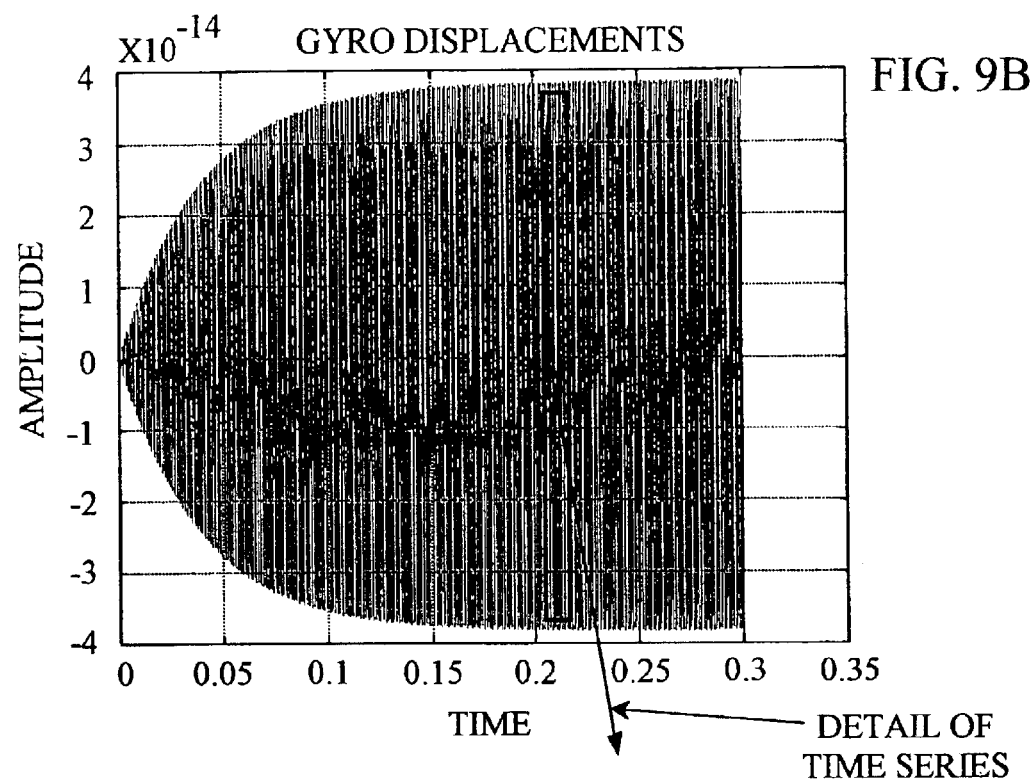
Figure 9B:
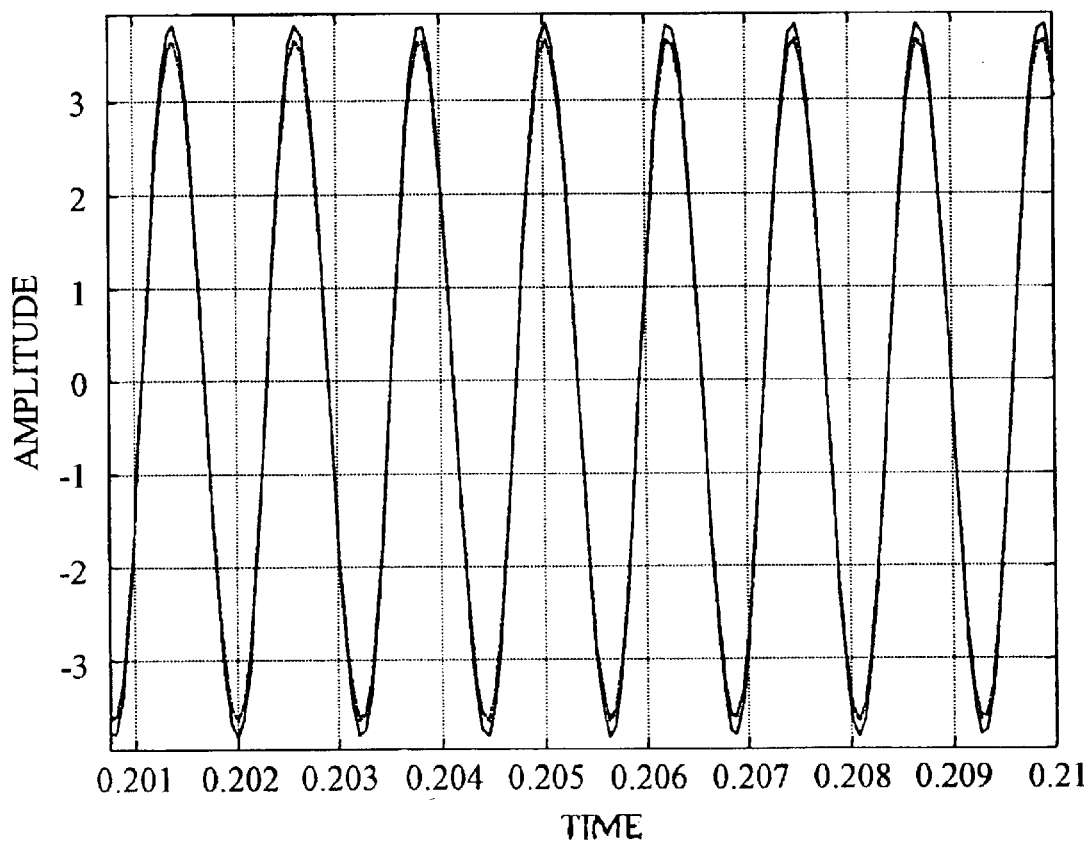

FIGS. 9A–B illustrate the individual time series for the output of uncoupled and coupled arrays of three vibratory gyroscopes, respectively, when a constant amplitude harmonic force is applied to the array. For the uncoupled array output shown in FIG. 9A, the gyroscopes are not synchronized. For the coupled array output shown in FIG. 9B, the gyroscope outputs are synchronized and the amplitudes are significantly larger than the uncoupled array.

Figure 10:
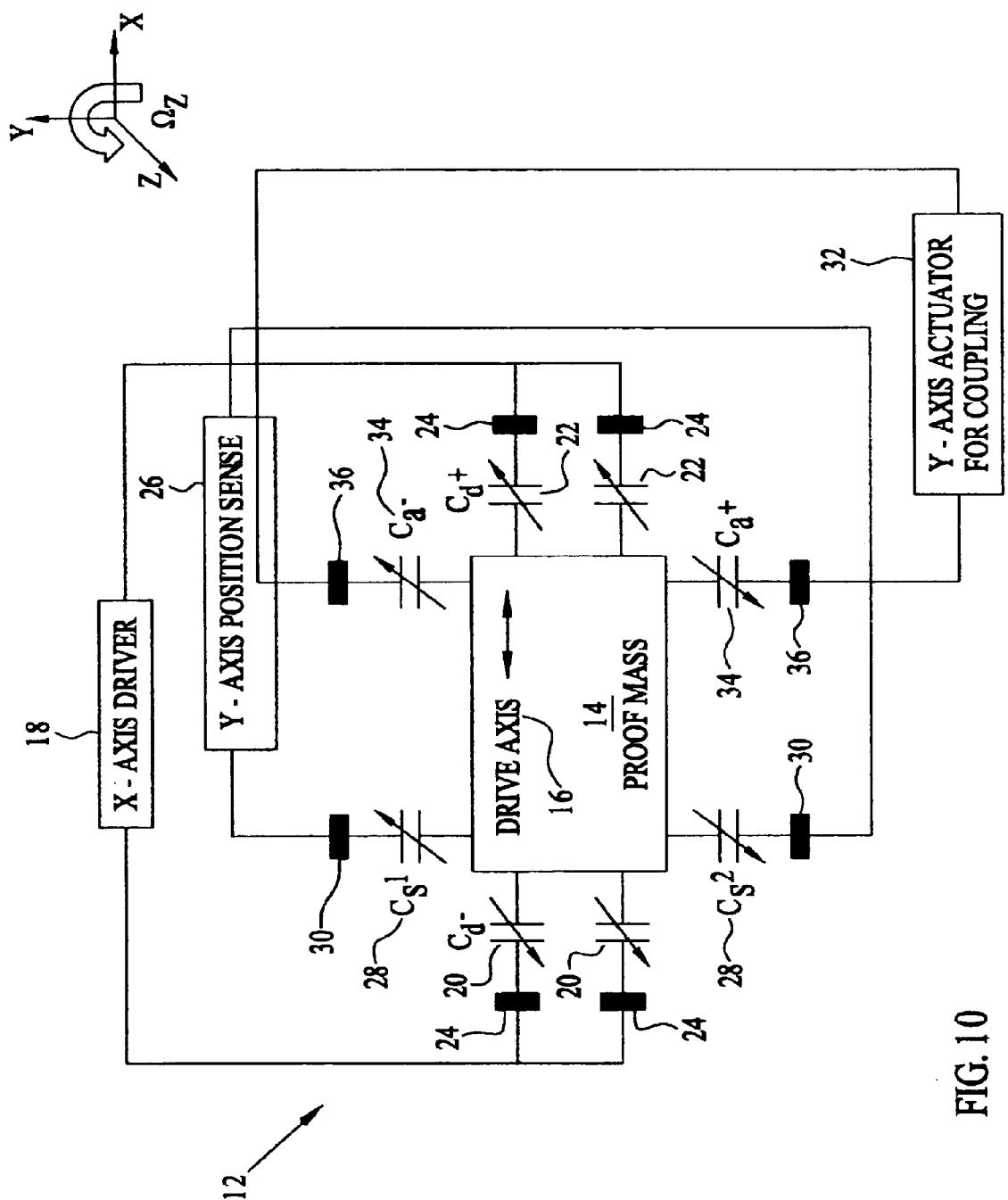
FIG. 10 illustrates example drive, sensing and control electronics for an individual vibratory gyroscope.

Referring now to FIG. 10, a model of a single z-axis gyroscope 12 is shown wherein a gyroscope proof mass is driven along the x-axis and the y-axis of the gyro is used to sense the Coriolis force induced by rotation about the z-axis of the gyro. Depicted are example driver, sense and positioning schemes for use with the gyro and of which will be described in further detail. Gyro 12 has a proof mass 14 whose movement is in the direction of the drive axis 16 is effectuated via driver control 18, and actuators 20 and 22, in this example capacitors, that move the mass with respect to relatively fixed references 24.

The sensor axis (y-axis) movement is detected via position sensor electronics 26 that is operably connected to sensors 28, in this example capacitors, that are used to monitor y-axis movement with respect to relatively fixed references 30.

Also shown in this figure is a mechanism for coupling the sensor (y-axis) of the gyro to other gyros to effectuate an enhanced sensing capability as has been described above. Specifically, actuator electronics 32 are operably connected to adjustors 34 (for example, capacitors) that are used in conjunction with relatively fixed references 36 to aid in synchronizing the sensor axis movement of the gyro with other gyros similarly coupled in an array.

Figure 11:
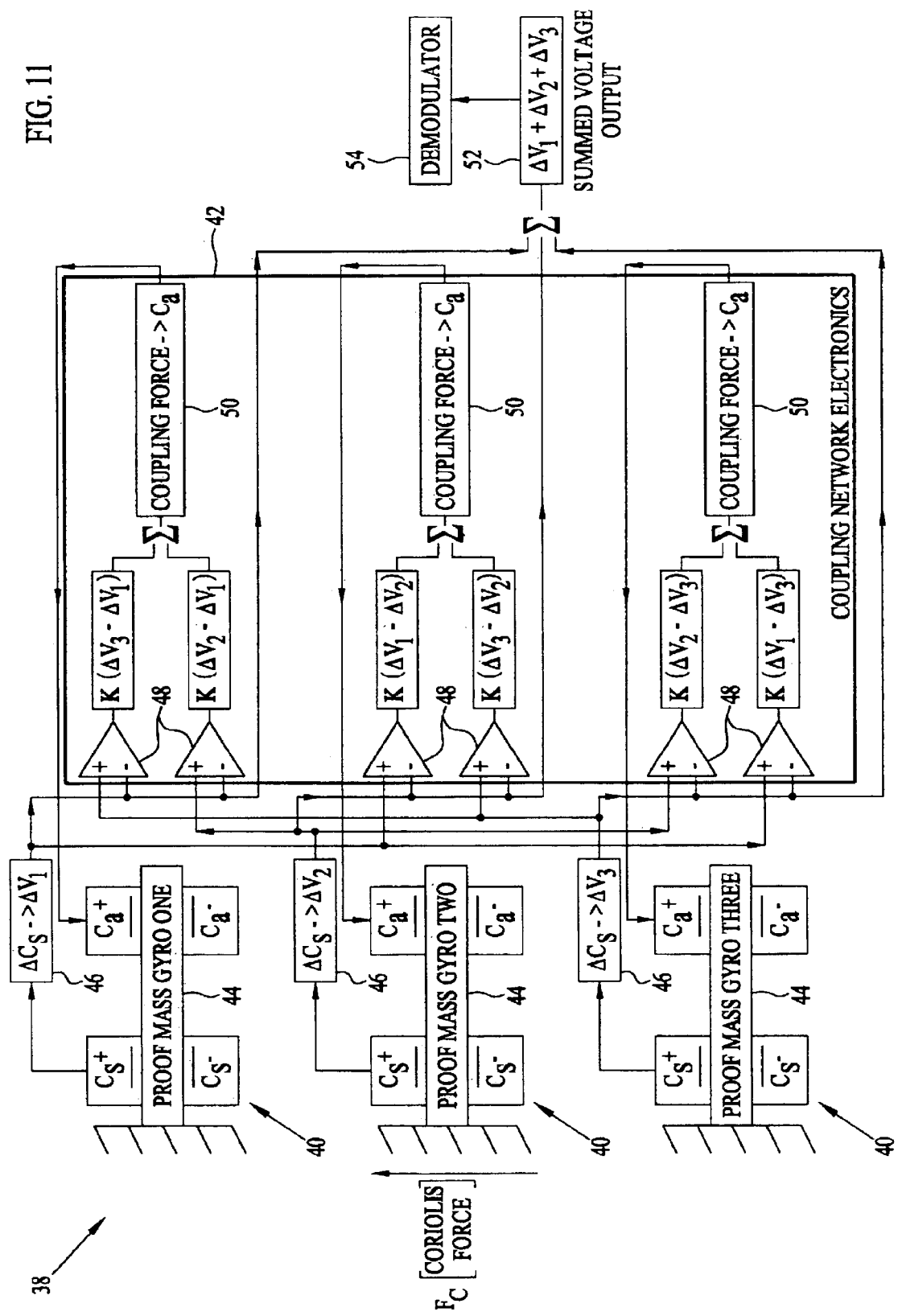
FIG. 11 illustrates an example coupling network as utilized with an array of three vibratory gyroscopes.

In FIG. 11, a model implementation of an array 38 of three vibratory gyroscopes 40 is shown employing a coupling network 42. The vibratory gyroscopes, such as those that may be produced through MEMS technology, are shown with capacitors to sense displacements due to the Coriolis force and to apply an electrostatic force to implement network 42. In this figure, only the motion of the gyroscope array along the sense axis of the array is shown.

Each gyroscope 40 has capacitors Cs+ and Cs– to measure the position of its respective proof mass 44 and capacitors Ca+ and Ca– to apply an electrostatic force to couple the gyroscope to other gyros in array 38.

Coupling network 42 implements a linear, nearest-neighbor coupled system with a coupling strength K. Network 42 is used to synchronize the motion of each gyroscope 40 in array 38 to the motion of the other interconnected gyroscopes 40 of the array. As will be described in greater detail, electronics 46 covert a variation in capacitance ($\Delta$Cs) due to changes in the position of proof mass 44 to a voltage difference ($\Delta$V). Network 42 uses comparators 48 to compare the voltage output from each gyroscope to its neighbors and applies a summed converted voltage 50 to capacitors Ca+ and Ca– to induce a force to synchronize its displacement to its neighbor gyroscopes. Coupling strength factor κ is a user chosen factor based upon a selected gain performed by differential amplifiers 48.

The voltage output 46 from each of gyroscopes 40 are then summed to provide a summed output voltage 52 that is processed in a demodulator 54 to convert the voltage-represented-Coriolis information into angular displacement data affecting the gyroscopes.

Figure 12:
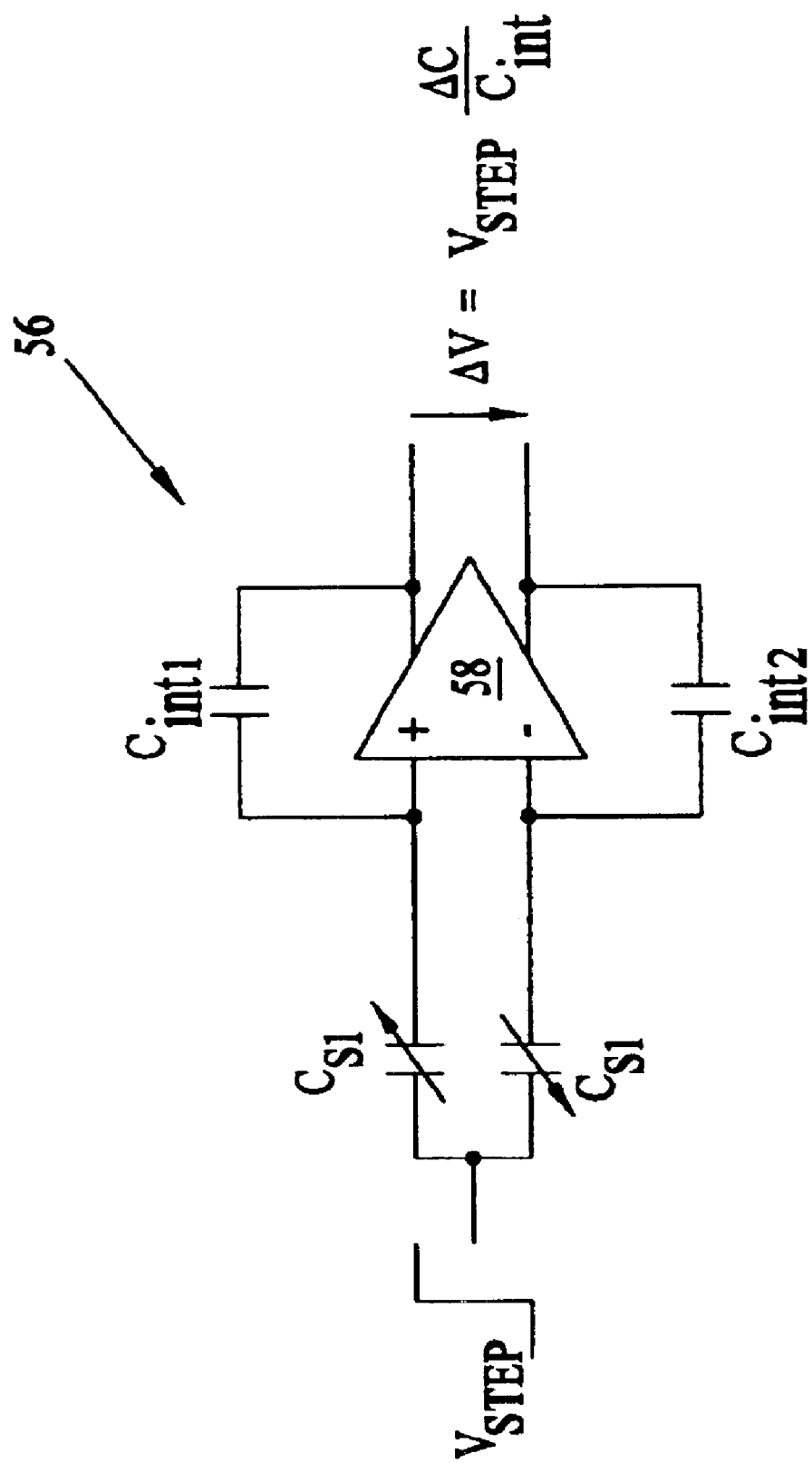
FIG. 12 shows an example differential sensing scheme as may be used to detect movement of a vibratory gyroscope proof mass.

In FIG. 12, a differential capacitive position sensor 56 such as may be employed as element 28 of FIG. 10 or as capacitors Cs+ and Cs– of FIG. 11 is shown. Position sensor 56 can be used to convert variations in the capacitance of a parallel plate capacitor to a voltage output. The variations in the capacitance are caused by motion of the gyroscope proof mass along its sense axis as induced by the Coriolis force. This motion will cause the air gap separating the parallel plates of the capacitors to vary, thereby inducing a change in capacitance. A differential sensing method is shown using a step voltage applied to Cs1 and Cs2 and an operational amplifier 58 to produce a change in voltage that is proportional to the change in the capacitance induced by the motion of the proof mass along the sense or Y-axis of the gyro.

Figure 13:
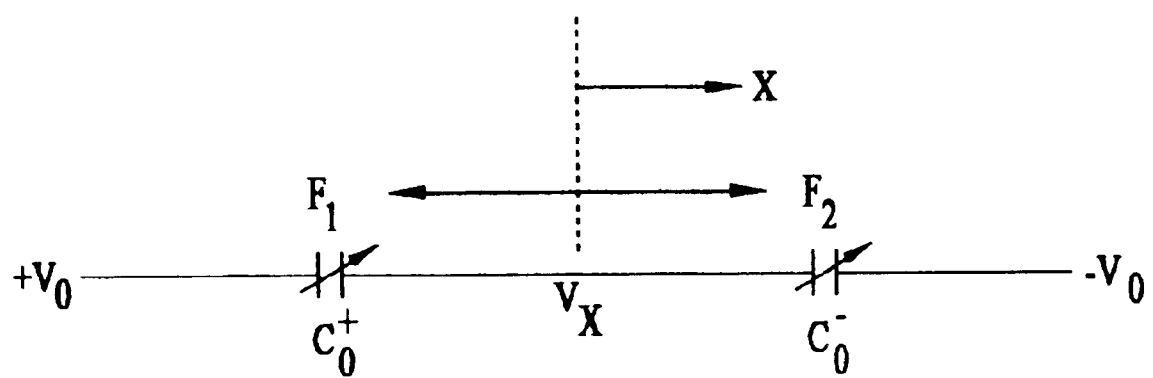
FIG. 13 depicts an example electrostatic actuator as may be used with a vibratory gyroscope.

In FIG. 13, an example of how capacitors Ca+ and Ca– of FIGS. 10 and 11 can be used to produce an electrostatic adjustment force to the gyroscope proof mass is shown. The force applied, for example, will be based on the output of coupling electronics 50 shown in FIG. 11. Capacitors Ca+ and Ca– can be used as a linearized electrostatic actuator to adjust the proof mass orientation along the Y-axis of the gyroscope.

A multitude of benefits are derived using a coupling network to synchronize the displacements of individual oscillators in an array of N oscillators, including:

1) A summed output signal strength that is N*Single Oscillator (for complete synchronization);

2) Array noise is averaged prior to output demodulation; and

3) Only a single demodulator is necessary for any number of oscillators in the array.

Obviously, many modifications and variations of the invention are possible in light of the above description. It is therefore to be understood that within the scope of the appended claims, the invention may be practiced otherwise than as has been specifically described.

What is claimed is:

1. An apparatus comprising:

a plurality of oscillators wherein each oscillator is characterized by a mass, a spring and a damper component and wherein at least one of said oscillators in said plurality of oscillators differs from another of said oscillators in said plurality of oscillators by at least one of said mass, spring and damper components, and further wherein an external force applied to each oscillator in said plurality of oscillators generates an oscillator frequency and an oscillator phase in each of said oscillators in said plurality of oscillators; and means for coupling said oscillators so that differences in said oscillator phases is minimized.

2. The apparatus of claim 1 wherein said means for coupling said oscillators includes:

means for sensing said phase of each of said oscillators; and means for adjusting said phase of each of said oscillators.

3. The apparatus of claim 2 wherein said means for sensing includes capacitive plates.

4. The apparatus of claim 3 wherein said means for adjusting includes capacitive plates.

5. The apparatus of claim 1 wherein said means for coupling said oscillators includes using a nearest neighbor coupling network.

6. The apparatus of claim 1 wherein each said oscillator is a vibratory gyroscope having a proof mass and an output indicative of a change of position of said proof mass.

7. The apparatus of claim 6 wherein said proof mass of each of said vibratory gyroscopes has a sense axis and wherein said output indicative of a change of position of said proof mass is a change in angular orientation of said sense axis.

8. The apparatus of claim 6 wherein each of said vibratory gyroscopes is arranged to sense a change of position along a common axis.

9. The apparatus of claim 8 wherein all outputs of said vibratory gyroscopes are summed to provide a resultant output.

10. The apparatus of claim 6 wherein said change in position of said proof mass is a change in an angular orientation of said proof mass.

11. The apparatus of claim 1 wherein said external force is the Coriolis force.

12. The apparatus of claim 1 wherein each of said mass, spring and damper components have a mean value and said components are varied about said mean value by up to 10 percent.

13. The apparatus of claim 12 wherein said spring components are substantially equal and said damper components are substantially equal.

14. An apparatus comprising:
    a plurality of vibratory gyroscopes wherein each vibratory gyroscope is characterized by a mass, a spring and a damper component and wherein at least one of said vibratory gyroscopes in said plurality of vibratory gyroscopes differs from another of said vibratory gyroscopes in said plurality of vibratory gyroscopes by at least one of said mass, spring and damper components,
    and further wherein Coriolis force is applied to each vibratory gyroscope in said plurality of vibratory gyroscopes thereby generating an oscillator frequency and an oscillator phase in each of said vibratory gyroscopes in said plurality of vibrator gyroscopes; and
    means for coupling said vibratory gyroscopes so that differences in said oscillator phases is minimized.

15. The apparatus of claim 14 wherein said means for coupling said vibratory gyroscopes includes:
    means for sensing said phase of each of said vibratory gyroscopes; and
    means for adjusting said phase of each of said vibratory gyroscopes.

16. The apparatus of claim 15 wherein said means for sensing includes capacitive plates.

17. The apparatus of claim 15 wherein said means for adjusting includes capacitive plates.

18. The apparatus of claim 14 wherein said means for coupling said vibratory gyroscopes includes using a nearest neighbor coupling network.

19. The apparatus of claim 14 wherein each said vibratory gyroscope has a proof mass and an output indicative of a change of position of said proof mass.

20. The apparatus of claim 19 wherein said proof mass of each vibratory gyroscope has a sense axis and wherein said output indicative of a change of position of said proof mass is a change in angular orientation of said sense axis.

21. The apparatus of claim 20 wherein each of said vibratory gyroscopes is arranged to sense a change of position along a common axis.

22. The apparatus of claim 21 wherein all outputs of said vibratory gyroscopes are summed to provide a resultant output.

23. The apparatus of claim 14 wherein each of said mass, spring and damper components have a mean value and said components are varied about said mean value by up to 10 percent.

24. The apparatus of claim 23 wherein said spring components are substantially equal and said damper components are substantially equal.

* * * * *